United States Patent [19]

Barron, Jr.

[11] Patent Number: 4,899,725
[45] Date of Patent: Feb. 13, 1990

[54] BARBECUE GRILL

[76] Inventor: James O. Barron, Jr., Rte. 9, Box 352C, Albany, Ga. 31705

[21] Appl. No.: 348,882

[22] Filed: May 8, 1989

[51] Int. Cl.⁴ ............................................. F24C 3/00
[52] U.S. Cl. ................................................. 126/41 R
[58] Field of Search ................................... 126/41 R

[56] References Cited

U.S. PATENT DOCUMENTS

| | | | |
|---|---|---|---|
| 994,598 | 6/1911 | Martin | 248/157 |
| 2,515,911 | 7/1950 | Thomas | 248/157 |
| 3,688,757 | 9/1972 | Dusek | 126/9 R |
| 3,802,413 | 4/1974 | Pepin | 126/41 R |
| 4,321,857 | 3/1982 | Best | 126/41 R |
| 4,677,964 | 7/1987 | Lohmeyer et al. | 126/41 R |

*Primary Examiner*—Carroll B. Dority
*Attorney, Agent, or Firm*—Leon Gilden

[57] ABSTRACT

A barbecue grill is set forth to enhance ease of use, cleaning, and optional use of pressurized fuel or charcoal briquettes. The grill utilizes a plurality of removable burners operably associated with fuel conduits of a propane-type storage tank. Underlying the burners is a slidably mounted drip tray that may be further utilized as a support for charcoal briquettes upon removal of the burner units, which are also slidably mounted within the framework of the barbecue grill. Additionally, a wind panel utilizing hingedly mounted side panels surrounds the central cooking grid and a series of circular burners. Further, the organization includes a telescopingly mounted lower leg overlying a fixed upper leg with a storage shelf rigidly mounted to the lower legs for compact storage of the organization.

1 Claim, 2 Drawing Sheets

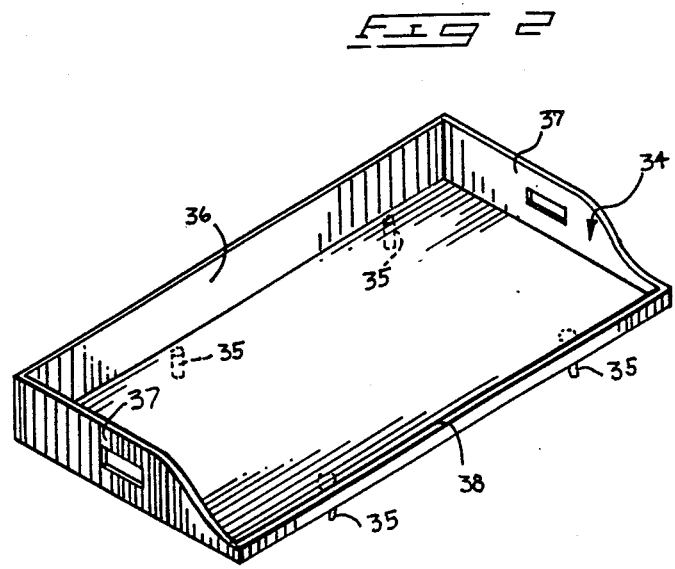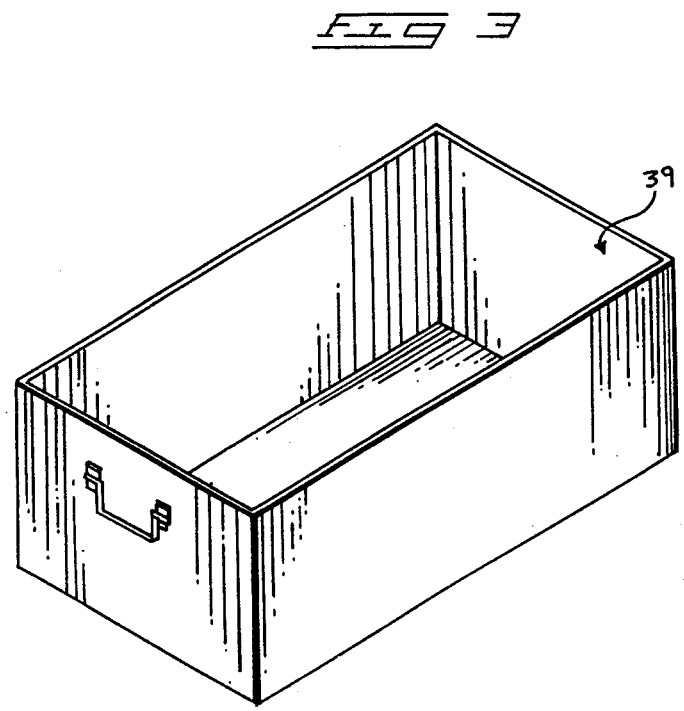

BARBECUE GRILL

BACKGROUND OF THE INVENTION

1. Field of the Invention

The field of invention relates to barbecue grills, and more particularly pertains to a new and improved barbecue grill wherein the same may optionally use charcoal briquettes upon removal of burners slidably mounted within the framework of the organization.

2. Description of the Prior Art

Barbecue grills have been readily known in the prior art utilizing both charcoal or propane as fuel. The prior art, however, has heretofore failed to provide a unique organization employing a structure to optionally employ charcoal briquettes or pressurized fuel. For example, U.S. Pat. No. 4,662,349 to McKenzie, et al., sets forth a barbecue grill utilizing a perforated ceramic heating element organization emitting infrared radiation in cooperation with the flammable fuel utilized.

U.S. Pat. No. 4,773,319 to Holland sets forth a barbecue grill wherein the barbecue system utilizes a grease collection and drainage system to convert the barbecue grill to a smoker and steamer in use.

U.S. Pat. No. 4,741,321 to Squires provides a portable barbecue with a compact inter-related grid organization to enhance cooking of food oriented therein. The grill organization utilizes a gas fired heating member for providing heating, as is conventional in such systems.

U.S. Pat. No. 4,628,897 to Stanfa provides a gas broiler for outdoor use with food on the grid associated with the grill further cooked by heat radiating downwardly from burner blocks to also reduce carbon dioxide level in the cooking compartment.

U.S. Pat. No. 4,593,676 to Wackerman provides a barbecue grill utilizing a self-cleaning principle in association with a flame development of the burner mechanism of the grill.

As such, it may be appreciated that there is a continuing need for a new and improved barbecue grill which addresses both the problems of convenience in use and effectiveness in construction, and in this respect, the present invention substantially fulfills this need.

SUMMARY OF THE INVENTION

In view of the foregoing disadvantages inherent in the known types of barbecue grills now present in the prior art, the present invention provides a barbecue grill wherein the same incorporates a multi-purpose barbecue grill utilizing a selective heat source for cooking food positioned on a cooking grid. As such, the general purpose of the present invention, which will be described subsequently in greater detail, is to provide a new and improved barbecue grill which has all the advantages of the prior art barbecue grills and none of the disadvantages.

To attain this, the present invention comprises a barbecue grill utilizing a plurality of spaced retractable burner segments that may be slidably retained and removed from within a framework to underlie a cooking grid. The burner segments are removable to expose a grease drip pan that additionally may provide support for charcoal briquettes upon removal of the burner segments. Additional circular burners, as well as convenience features such as utensil hooks, cutting board, spice rack, wind deflecting shield, storage rack, and telescoping wheels provide an organization for enhanced ease of use and compact storage of the organization, as desired.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved barbecue grill which has all the advantages of the prior art barbecue grills and none of the disadvantages.

It is another object of the present invention to provide a new and improved barbecue grill which may be easily and efficiently manufactured and marketed.

It is a further object of the present invention to provide a new and improved barbecue grill which is of a durable and reliable construction.

An even further object of the present invention is to provide a new and improved barbecue grill which is susceptible of a low cost of manufacture with regard to both materials and labor, and which accordingly is then susceptible of low prices of sale to the consuming public, thereby making such barbecue grills economically available to the buying public.

Still yet another object of the present invention is to provide a new and improved barbecue grill which provides in the apparatuses and methods of the prior art some of the advantages thereof, while simultaneously overcoming some of the disadvantages normally associated therewith.

Still another object of the present invention is to provide a new and improved barbecue grill wherein the same enables selective use of either charcoal or pressurized fuel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an isometric illustration of a grill utilized by the instant invention.

FIG. 3 is an isometric illustration of a roasting pan as utilized by the instant invention.

DESCRIPTION OF THE PREFERRED EMBODIMENT

Figure 1:
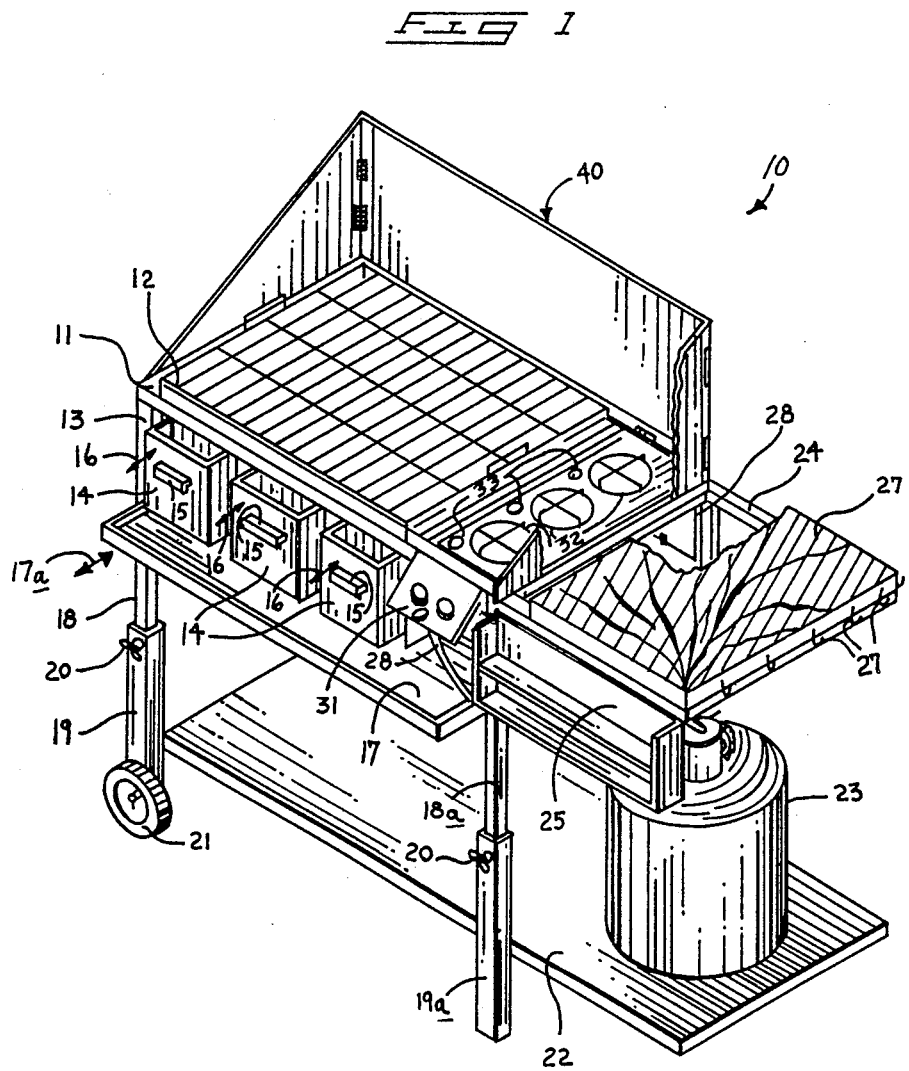
FIG. 1 is an isometric illustration of the instant invention.
Figure 1A:
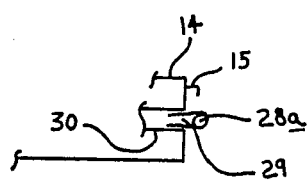
FIG. 1a is an orthographic diagrammatic view of a sliding relationship of the burner unit of the instant invention in conjunction with a pressurized fuel source.

With reference now to the drawings, and in particular to FIGS. 1 to 4 thereof, a new and improved barbecue grill embodying the principles and concepts of the present invention and generally designated by the reference numeral 10 will be described.

More specifically, the barbecue grill 10 of the instant invention essentially comprises a rectangular support framework 11 supporting a cooking grid 12 thereon with spaced handles aligned and positioned at either end thereof. The support framework 11 overlies a support framework 13 to define a rectangular parallelepiped configuration. Directed through a forward portion of the support frame 13 are a series of three burner units 14 slidingly mounted within the support framework 18 and including a pair of spaced "L" shaped shelf handles 15 affixed to forward and rear end walls of the burner units 14. First arrows 16 illustrate the sliding relationship of the burner units 14 interiorly of the support frame 13. The burner units 14 are also provided with through-extending apertures (not shown) to permit grease and the like to be directed to a drip pan 17 slidably mounted in the direction of the second arrow 17a into and out of the support framework in an orientation parallel to the direction of available reciprocation of the burner units 14.

Rear fixed legs extend orthogonally downwardly from the support frame 13 spaced from parallel forward fixed legs 18a with sliding legs 19 and forward sliding legs 19a respectively, telescopingly receiving the rear fixed legs 18 and forward fixed legs 18a therewithin utilizing conventional clamps 20 to secure the sliding legs relative to the fixed legs in an extended or retracted configuration to enable storage of the barbecue grill 10 in a collapsed configuration. The storage shelf 22 is integrally fixed to the sliding legs 19 and 19a and accordingly reciprocates therewith. The storage shelf 22 extends beyond the perimeter defined by the sliding legs to a right side of the barbecue grill 10 to mount a fuel tank 23 thereon to provide compressed fuel to the various burner organizations within the barbecue grill. A rectangular support bracket 24 extends in an aligned relationship to the support framework 11 overlying and parallel to the storage shelf 22 and supports a spice rack 25 onto a forward wall of the support bracket 24 with the spice rack provided with a plurality of spaced parallel shelves to accommodate various spices, as utilized in a cooking operation. Utensil hooks 26 are integrally secured to an end portion of a utility board 27 of a configuration substantially equal to that defined by the support bracket 24. A fuel conduit 28 directs fuel from the fuel tank 23 through the burner control unit 31 whereupon the trio of controls upon the burner control unit 31 includes a series of three further fuel conduit lines 28a directing fuel through an associated valve controlled by the dials on the control unit 31 and positioned and arranged rearwardly of each of the burner units 14. The further fuel conduits 28a include a solid nozzle 29 whereupon the sliding positioning of each burner 14 interiorly of the support frame 13 directs a burner fuel conduit 3 to receive slidingly therein a respective solid nozzle 29 to thereby associate each further fuel conduit 28a with an associated burner unit 14, as desired. The easily removed burner units enable cleaning and maintenance of the burner units or modular replacement thereof, as is deemed necessary. Additionally, a series of circular burners 32 are oriented adjacent the cooking grid 12, each including individual burner control 33. Hingedly mounted rearwardly of the cooking grid 12 on the support framework 11 is a rear wind panel 40 utilizing hingedly mounted side panels to deflect undesirable wind gust and the like from interrupting a cooking operation. When not in use, the rear wind panel 40 may be interfolded and positioned overlying the cooking grid for compact storage of the barbecue grill 10.

Attention to FIG. 2 illustrates a griddle 34 that may be positioned, as is deemed necessary, upon the cooking grid 12 with an elongate rear wall 36 and coextensive forwardly tapered side walls 37 terminating in a height equal to a forward lip 38 to maintain cooking residue and fluids upon an upper surface of the griddle. The griddle includes a plurality of pairs of forward and rear positioning pegs 35 orthogonally oriented and directed downwardly of a bottom surface of the griddle 34 to maintain alignment of the griddle 34 when positioned upon the cooking grid 12. FIG. 3 is illustrative of a roasting pan, as utilized by the instant invention, whereupon the griddle 34 and the roasting pan 30 may be stored upon the storage shelf 22 during periods of non-use.

Further when pressurized fuel, such as propane 23, is not available, the individual burner units 14 may be removed from interiorly of the support frame 13 whereupon the drip pan 17 may be utilized to support a quantity of charcoal briquettes and the like to provide an alternative fuel for the cooking of various foods positioned upon the cooking grid 12.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvioius to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A barbecue grill comprising,
   a horizontal support framework with a cooking grid mounted thereon,
   and a support frame underlying the support framework to define a rectangular parallelepiped configuration,
   and a plurality of burner units each mounted within the support frame,
   and a drip pan underlying the burner units and slidingly mounted within the support frame,
   and plural pairs of fixed legs integrally secured to the support frame and directed orthogonally downwardly therefrom, and each fixed leg cooperatingly secured to a further leg,
   and wherein each further leg telescopingly receives a fixed leg with a clamp member directed through each further leg to secure each fixed leg relatively thereto in a preselected orientation,
   and including a planar storage shelf integrally secured to each further leg and extending beyond a plurality of further legs beyond the support frame, and a pressurized fuel tank supported on the support shelf,
   and including a rectangular support bracket aligned with and directed outwardly of the support framework overlying the support shelf, and the support framework including a utility board fixedly secured thereon, and a plurality of utensil hooks integrally secured to side wall of the utility board, and a spice rack integrally secured to a forward wall of the support bracket directed orthogonally downwardly therefrom with a plurality of spaced shelves integrally formed to the spice rack,
   and wherein each of the burner units are slidingly mounted within the support frame, and each burner unit includes a handle fixedly secured to a forward wall thereon,
   and wherein each burner unit includes a burner conduit slidably receiving a fluid nozzle therewithin when each burner unit is secured within the support framework,
   and wherein a burner control unit is fixedly mounted to the support framework wherein each burner unit includes a fuel conduit directed from the fuel tank to the burner control unit, and the burner control unit includes an individual further fluid conduit with a valve associated therewith directed from the burner control unit to the fluid nozzle,
   and including a plurality of circular burners, with each circular burner including an individual burner control secured onto the support frame adjacent the cooking grid,
   and including a wind panel hingedly mounted to the support frame wherein the wind panel includes a side panel hingedly mounted to each end of the wind panel.

* * * * *